(12) United States Patent
Dieckröger et al.

(10) Patent No.: US 6,894,269 B2
(45) Date of Patent: May 17, 2005

(54) CONFIGURATION FOR DETECTING OPTICAL SIGNALS IN AT LEAST ONE OPTICAL CHANNEL IN A PLANAR LIGHT CIRCUIT, ATTENUATOR INCLUDING THE CONFIGURATION, AND METHOD FOR MANUFACTURING THE CONFIGURATION

(75) Inventors: Jens Dieckröger, München (DE); Frank Singer, Regensburg (DE)

(73) Assignee: Optun (BVI) Ltd., Tortola (VG)

( * ) Notice: Subject to any disclaimer, the term of this patent is extended or adjusted under 35 U.S.C. 154(b) by 0 days.

(21) Appl. No.: 10/075,536

(22) Filed: Feb. 14, 2002

(65) Prior Publication Data

US 2002/0158190 A1 Oct. 31, 2002

Related U.S. Application Data

(63) Continuation of application No. PCT/DE01/01669, filed on Apr. 30, 2001, and a continuation-in-part of application No. PCT/DE01/02078, filed on May 25, 2001.

(51) Int. Cl.[7] .................................................. H01J 3/14
(52) U.S. Cl. ...................................... 250/216; 250/239
(58) Field of Search ................................. 250/239, 216, 250/227.11, 227.21, 227.24; 385/8, 9, 12

(56) References Cited

U.S. PATENT DOCUMENTS

| | | | |
|---|---|---|---|
| 5,909,523 A | | 6/1999 | Sakaino et al. |
| 6,083,843 A | * | 7/2000 | Ohja et al. .................. 438/710 |
| 6,093,939 A | | 7/2000 | Artigue et al. |

FOREIGN PATENT DOCUMENTS

| | | |
|---|---|---|
| EP | 0 331 332 A2 | 9/1989 |
| EP | 0 723 171 A2 | 7/1996 |
| EP | 0 807 981 A2 | 11/1997 |
| EP | 1 083 450 A1 | 3/2001 |
| FR | 2 795 872 A1 | 1/2001 |
| JP | 62-242362/1987 | 10/1987 |
| JP | 63-501393/1998 | 5/1988 |
| JP | 2-13909/1990 | 1/1990 |
| JP | 2-71203/1990 | 3/1990 |
| JP | 7-43564/1995 | 2/1995 |
| JP | 7-225329/1995 | 8/1995 |
| JP | 8-78657/1996 | 3/1996 |
| JP | 8-204288/1996 | 8/1996 |
| JP | 9-307134/1997 | 11/1997 |
| JP | 10-82930/1998 | 3/1998 |
| JP | 10-311936/1998 | 11/1998 |
| JP | 10-274729/1998 | 6/1999 |
| JP | 11-231176/1999 | 8/1999 |
| JP | 2000-304-951 | 11/2000 |
| JP | 2002-14258 | 1/2002 |
| JP | 2002-532747 | 10/2002 |

OTHER PUBLICATIONS

PCT Search Report: Application PCT/DE 01/02078, Feb. 18, 2002.

(Continued)

*Primary Examiner*—Que T. Le
(74) *Attorney, Agent, or Firm*—Eitan, Pearl, Latzer & Cohen Zedek, LLP

(57) ABSTRACT

A configuration detects optical signals in at least one optical channel in a planar light circuit. The planar light circuit contains a trench that respectively interrupts or terminates one optical channel. The trench respectively contains a detection unit detecting the optical signals in the respective optical channel. An attenuator apparatus includes an attenuator unit, a multiplicity of optical principal channels, and a configuration described above for detecting the optical signals in said monitor channels. A method for manufacturing the configuration includes the following steps: providing a support submount; mounting a detection unit on the support submount; providing a planar light circuit with an optical channel; interrupting the optical channel by forming a trench in the planar light circuit; disposing the support submount on the planar light circuit using flip-chip mounting; and inserting a detection unit into the trench.

19 Claims, 5 Drawing Sheets

OTHER PUBLICATIONS

Notice of Reasons for Refusal: Japanese Patent Application No. 2002-542590, Jun. 24, 2003.

S. Mino et al.: "Optoelectronic hybrid integrated laser diode module using planar lightwave circuit platform", *Electronics Letters*, vol. 30, No. 22, Oct. 27, 1994, pp. 1888–1890.

Johan E. van der Linden et al.: "Cost–Effective and High–Density integration of Monitoring Photodetector Arrays onto Polymeric Guided–Wave Components", 1998 *Electronic Components and Technology Conference*, pp. 1012–10–17, month unknown.

* cited by examiner

CONFIGURATION FOR DETECTING OPTICAL SIGNALS IN AT LEAST ONE OPTICAL CHANNEL IN A PLANAR LIGHT CIRCUIT, ATTENUATOR INCLUDING THE CONFIGURATION, AND METHOD FOR MANUFACTURING THE CONFIGURATION

CROSS-REFERENCE TO RELATED APPLICATION

This application is a continuation of copending International Applications PCT/DE01/01669, filed Apr. 30, 2001, and PCT/DE01/02078, filed May 25, 2001, which both designated the United States.

BACKGROUND OF THE INVENTION

Field of the Invention

The invention relates to a configuration for detecting optical signals in at least one optical channel in a planar light circuit and to a method for manufacturing such a configuration. Such detection units are used, in particular, for monitoring individual channels in a planar light circuit by measurement.

Planar light circuits (PLC) require the signals in the individual optical channels to be monitored by measurement. An example of this is monitoring of the optical signals upstream and downstream of an attenuator array, which performs channel-dependent attenuation of the levels of individual data channels in the array. Channel-dependent attenuation permits different levels in the optical channels to be equalized.

However, monitoring the individual channels by measurement encounters the problem that the waveguide layers carrying the optical signals are normally buried in the planar light circuit. To detect an optical signal in the planar light circuit, the optical signal via integrated waveguides must be routed to the end face of the circuit and, there, to a photodiode unit mounted on the end face. However, the fact that the waveguides are all in one plane results, in this case, in disturbing waveguide crossings between the individual data channels, which cause channel-dependent losses and crosstalk. It can also be regarded as a drawback that the photodiode unit needs to be positioned extremely precisely with respect to the output waveguides at the end face of the planar light circuit.

An example of an attenuation unit known in the prior art is shown in FIG. 7. The individual optical data channels 11 to 1n in an array 10 are routed through an attenuation unit 2. In the attenuation unit 2, the signals in the individual data channels are subjected to channel-dependent attenuation by respective attenuation units 21–2n and are equalized to a common level. The attenuation units 21–2n are normally in the form of thermo-optical Mach-Zehnder interferometers in which the signals in the individual data channels are respectively split over two arms and are brought together again in one arm, possibly after phase shifting. The phase shifting can be used to set the attenuation for the optical signal carried in the data channel.

Upstream and downstream of the attenuation unit 2, the individual channels 11–1n in the array 10 are monitored. The signal to be monitored is injected into monitor waveguides 101–10n using weakly coupling directional couplers 3. These monitor waveguides 101–10n are used to route the signal to the end of the planar light circuit, where it is detected by a photodiode array 4. A drawback of this configuration is that each monitor waveguide 101–10n on its way to the photodiode array 4 crosses between 0 and n−1 waveguides in the array, is depending on the channel. The crossing over of the monitor waveguides and the signal-carrying waveguides results in channel-dependent losses and in crosstalk from the other waveguides in the array.

SUMMARY OF THE INVENTION

It is accordingly an object of the invention to provide a configuration for detecting optical signals in at least one optical channel in a planar light circuit, an attenuator including the configuration, and a method for manufacturing the configuration that overcome the hereinafore-mentioned disadvantages of the heretofore-known devices of this general type and that ease detection of the optical signals. In this context, signals in the optical channels in a planar light circuit need to be monitored easily by measurement, with reduction of the signal losses in the waveguides and without any undesirable crosstalk. In particular, such monitoring by measurement is to be provided for an attenuator apparatus. In addition, a method for manufacturing such a configuration is intended to be provided.

With the foregoing and other objects in view, there is provided, in accordance with the invention, a configuration for detecting optical signals. The configuration features a planar light circuit including an optical channel. A trench formed in the planar light circuit interrupts the optical channel. The trench includes a detection unit detecting optical signals in the optical channel.

With the objects of the invention in view, there is also provided an attenuator apparatus including an attenuator unit. A multiplicity of optical principal channels carry optical signals having an optical power, respectively passing through the attenuator unit, and have a respective associated monitor channel receiving a particular percentage of the optical power in the associated principal channel. A configuration as discussed above detects the optical signals in the monitor channels.

With the objects of the invention in view, there is also provided a method for manufacturing a configuration for detecting optical signals in an optical channel in a planar light circuit. The first step of the method is mounting a detection unit on a support submount. The next step is interrupting an optical channel by forming a trench in a planar light circuit. The next step is disposing the support submount on the planar light circuit using flip-chip mounting. The next step is inserting a detection unit into the trench.

Accordingly, the invention provides a configuration in which the planar light circuit contains at least one trench or a cutout which respectively interrupts or terminates at least one optical channel, and the trench(es) respectively contain(s) at least one detection unit that detects the optical signals in a channel. In this context, signal detection takes place essentially in the plane of the optical circuit. Hence, a hybrid configuration includes a planar light circuit and at least one detection unit integrated in the planar light circuit is proposed.

The inventive solution has the advantage that optical signals are detected directly at the point of output, because the detection unit is coupled directly to the waveguides and interrupted or terminated by the respective trenches. This local configuration of the detection unit means that it is no longer necessary to route monitor waveguides to the end face of the optical circuit, and, accordingly, there is also no longer any disturbing crossing of the monitor waveguides and the principal waveguides. This considerably facilitates monitoring by measurement.

The inventive solution reduces the overall component size, because the detection unit can be disposed directly on the planar light circuit and no longer has to be disposed on the end face. In addition, chip area is decreased as a result of the monitor signals now no longer needing to be routed to the end face of the planar light circuit.

The inventive solution also has a relatively high degree of positioning tolerance, since small displacements in the detector unit with respect to the buried waveguide barely influence detection of the signals in the waveguide.

In one preferred refinement of the invention, the detection units are disposed on a support submount and are inserted into the trenches in the planar light circuit upside down. This is done using "flip-chip mounting". The use of a submount to mount the detection units has a number of advantages.

First, disposing the detection units on a submount enables construction of rows of detection units, in particular photodiode rows, which can be mounted on the planar light circuit in one step. This allows a multiplicity of detection units to be mounted easily and quickly. In this context, the detection units or rows of detection units can be fully checked before integration in the planar circuit. If the detection units are disposed in the planar light circuit without using a support submount for the detection units, the check is admittedly likewise possible, but an important failure mechanism is the mounting itself. Replacing a, possibly, faulty photodiode is complex and is not always possible, however. This problem is eliminated if there is a preliminary check on the support submount.

Secondly, disposing the detection units on a submount enables interleaving of the detection units with one another, e.g. using conductor tracks applied using thin-film technology, in particular to connect the ground contacts of the detection units together. Active components, such as preamplifiers, can be integrated in the submount as well.

Preferably, two rows of photodiodes are offset with respect to one another on the support submount. This has the advantage that the photodiodes can be disposed as closely to one another as possible. On the basis of the two rows of photodiodes, the trenches in the planar light circuit are likewise produced in two rows and offset from one another.

The photodiodes have a bevel that is preferably at an angle to the plane of the planar light circuit. In this context, the pn-junction or np-junction of the photodiodes is directly at the photodiode surface. This means that only light which reaches the pn-junction (or np-junction) can contribute to the photodiode current. The angled bevel of the photodiode means that even light irradiated closely to the base of the photodiode is still refracted toward the photodiode surface. In this context, although this light may not be refracted directly to the photodiode surface, a normally high refractive index of the photodiode material (for example of 3.5 in the case of InGaAs/InP) means that it is kept in the photodiode by multiple reflections. A prerequisite for this is that the photodiode is surrounded by an optically thinner medium, for example air. This is the case when the photodiode is inserted upside down into appropriate trenches in the planar light circuit, however. Provided that the photodiode is additionally embedded in a transparent potting compound, the latter normally likewise has a lower refractive index than the material of the photodiode.

The injected light is thus reflected to and fro in the photodiode until it reaches the pn-junction or np-junction and is converted into photocurrent. This achieves a very high degree of positioning tolerance for the photodiode with respect to the buried waveguide in the planar circuit, because it is only necessary to ensure that light hits the bevel of the photodiode used in a trench at some point or other.

In one preferred refinement of the invention, the support submount is mounted on the optical circuit and makes contact via metalized areas on the planar light circuit, so that a compact configuration is obtained. To connect it to the contact areas on the optical circuit, the support submount preferably has solder bumps.

Solder bumps are, in particular, gold/tin or gold/lead spherical indentations that can be produced very precisely and inexpensively, for example electrochemically or using screen-printing technology. The solder bumps may also be "stud bumps" made of gold or of a gold/tin alloy. To connect the support submount and the planar light circuit, such solder bumps are put onto one of the two elements. In this context, it is advantageous to put the solder bumps on the support substrate, because in this case the benefit in terms of production (manufacturing the submounts in the form of a wafer and subsequent separation) is greater. In addition, processing solder bumps disposed on the planar light circuit as a result of the photodiodes which are in the trenches is more difficult.

In addition, the solder bumps' level, which can be varied over a wide range between approximately 20 $\mu$m and 200 $\mu$m, can advantageously be used for specifically setting the distance between the support submount and the planar light circuit, and hence the depth of penetration of the photodiodes into the trenches in the planar light circuit.

Preferably, the support submount has gold metalizations which simultaneously serve as a conductor track and as mounting areas for the photodiodes and/or solder bumps and/or bonding wires. This makes it possible to increase the degree of integration on the support submount.

In addition, the support submount is preferably of optically transparent construction. As a result of this, when the detection unit is mounted on the planar light circuit, a simple optical microscope can be used to monitor and set the orientation of the photodiode.

In another preferred refinement of the invention, the photodiodes are fitted on the support submount by laser soldering from below through the support submount. In this case, by way of example, gold pads are disposed on the surface of the submount and gold/tin solder is disposed on the back of the photodiode, these gold pads and gold/tin solder are connected by laser soldering. In this context, the submount is transparent to the laser light used. This practice permits mounting in the "blank", where a wafer including 1000 submounts, for example, is fitted with photodiodes before separation, the necessary connections are made and the fully fitted and connected submounts are then sawn out or separated using a wafer saw.

Alternatively, the photodiodes are bonded onto the support submount, in which case the adhesive is conductive or is not conductive, depending on whether or not rear contact with the photodiode is necessary. Mounting in the blank is also possible when the photodiodes are bonded.

The trenches formed in the planar light circuit preferably match the shape of the detection units used, so that the detection units can be inserted into the trenches with little play. This provides a self-aligning "plug-in principle" which facilitates mounting.

It is pointed out that it is within the scope of the invention for the detection units to be transparent to some of the light in the optical channels and/or to particular wavelengths, so that the optical channel/waveguide continues downstream of a detection unit.

In one preferred application of the invention, the inventive configuration for detecting optical signals is part of an attenuator apparatus in which a multiplicity of optical channels pass through a respective attenuator unit for the purposes of signal equalization. In this context, each optical principal channel has at least one associated monitor channel into which a particular percentage of the optical power in the optical principal channel is injected. In this case, the monitor channels are terminated by a respective detection unit as claimed in claim 1, i.e. the optical signal in the monitor channel is detected by detection units disposed in trenches in the circuit.

Before being terminated, the monitor channels run essentially parallel to the respective optical principal channels, without crossing one another or the principal channels in the process. This is actually a fundamental advantage of the invention, since the local detection of the signals in the planar light circuit means that the individual waveguides no longer need to cross one another, and hence crosstalk and channel-dependent losses are prevented.

In this context, provision is preferably made for the principal channel respectively to run at the side of the trenches for the detection units undisturbed in the planar light circuit, while the signal in the associated monitor channel running parallel is detected by the inventive configuration. Crosstalk with the principal channel or other principal channels is minimized in this case.

The method for manufacturing a detection configuration is distinguished by the following steps:
- at least one detection unit is mounted on a submount support;
- at least one trench is formed in a planar light circuit, a trench respectively interrupting at least one optical channel, and
- the submount support is disposed on the planar light circuit using flip-chip mounting, with at least one detection unit being respectively inserted into a trench.

Other features that are considered as characteristic for the invention are set forth in the appended claims.

Although the invention is illustrated and described herein as embodied in a configuration for detecting optical signals in at least one optical channel in a planar light circuit, an attenuator including the configuration, and a method for manufacturing such a configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 6:
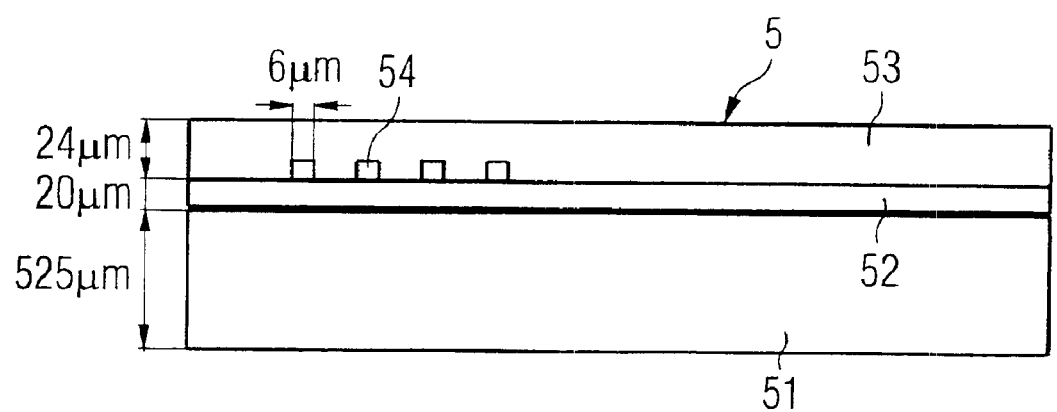
FIG. 6 is a sectional view through a planar light circuit with integrated optical waveguides.

Referring now to the figures of the drawings in detail and first, particularly to FIG. 6 thereof, there is shown a customary layout of a planar light circuit 5 (PLC) for the purposes of better understanding of the invention. To manufacture the PLC, a plurality of $SiO_3$ layers having various refractive indices are deposited on a silicon wafer 51. These layers are a buffer layer 52, a core layer (not shown), and a top layer 53. The core layer, situated between the buffer layer and the top layer, has the largest refractive index in this case. Before the core layer is covered with the top layer 53, a photolithographically produced mask (e.g.. AZ resist) and an etching method (e.g. RIE—Reactive Ion Etching) are used to structure the core layer such that only individual ribs 54 of this layer remain. These ribs 54 are then covered with the top layer 53 and form the light-carrying waveguide core. This core is disposed at a depth of approximately 20 jam in the $SiO_2$ layer system, which is approximately 40 um thick, and typically has a cross section of approximately 6×6 $\mu$m.

Figure 7:
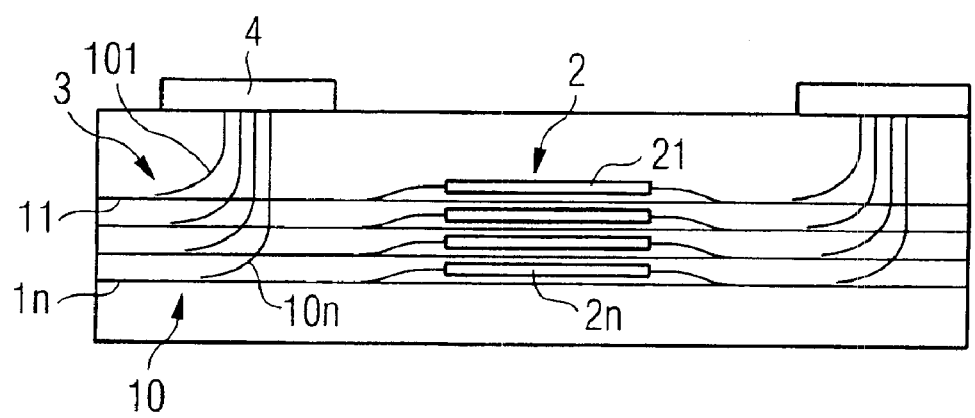
FIG. 7 shows a prior-art multichannel attenuator apparatus with signal monitoring.

To detect optical signals carried in the waveguide cores (ribs) 54, it is necessary in the prior art, as explained in the introduction with reference to FIG. 7, to route the waveguide cores to the end face of the PLC 5 and, there, to detect them using a detection unit.

Figure 1:
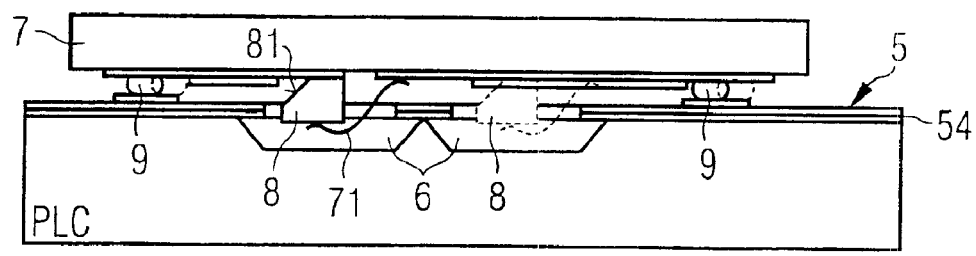
FIG. 1 is a diagrammatic sectional view showing a configuration for detecting optical signals in a planar light circuit.

An inventive detection unit is shown in FIG. 1. A cutout or a trench 6, which interrupts the waveguide 54, is formed in the $SiO_2$ layer (corresponding to the top layer 53 and the buffer layer 52 in FIG. 6) and up to the silicon wafer for the purpose of detecting an optical signal running in a waveguide or waveguide core 54. The trench 6 is preferably produced using an etching method. For trench etching, it is an obvious measure to etch the trenches at a depth of approximately 100 um, since this deep etching step is also performed for other function structures, for example in attenuator apparatuses.

The trenches 6 contain a respective photodiode 8 upside down. The photodiode 8 is fitted on a support submount 7 that is connected by solder bumps 9 to the planar light circuit 5 and is disposed on the latter. The photodiode 8 has a respective chamfered bevel 81 on its side facing the light that is to be detected.

In one alternative refinement (not shown), one or more trenches are provided which each interrupt more than one optical channel, with a respective plurality of photodiodes being placed in one trench accordingly.

Contact is made with the photodiode 8 firstly via a metalization on the side fitted on the submount 7 and secondly via a bonding wire 71 that detects a contact area (not shown) on the photodiode surface (bottom face). Alternatively, with appropriate refinement of the photodiode, provision may also be made for both contacts to be produced on the side facing the submount 7.

Provision may be made for the detection unit 8 to detect only light of particular wavelengths, while other wavelengths pass through the detection unit 8 essentially undisturbed and are routed further in the waveguide core 54. In addition, it is possible for the detection unit to absorb only a certain portion of the light signals and to convert that portion into an electrical signal, for example a few percent of the light, so that only a portion of the power of the optical signals is output, while another portion is routed further in the waveguide.

Figure 2:
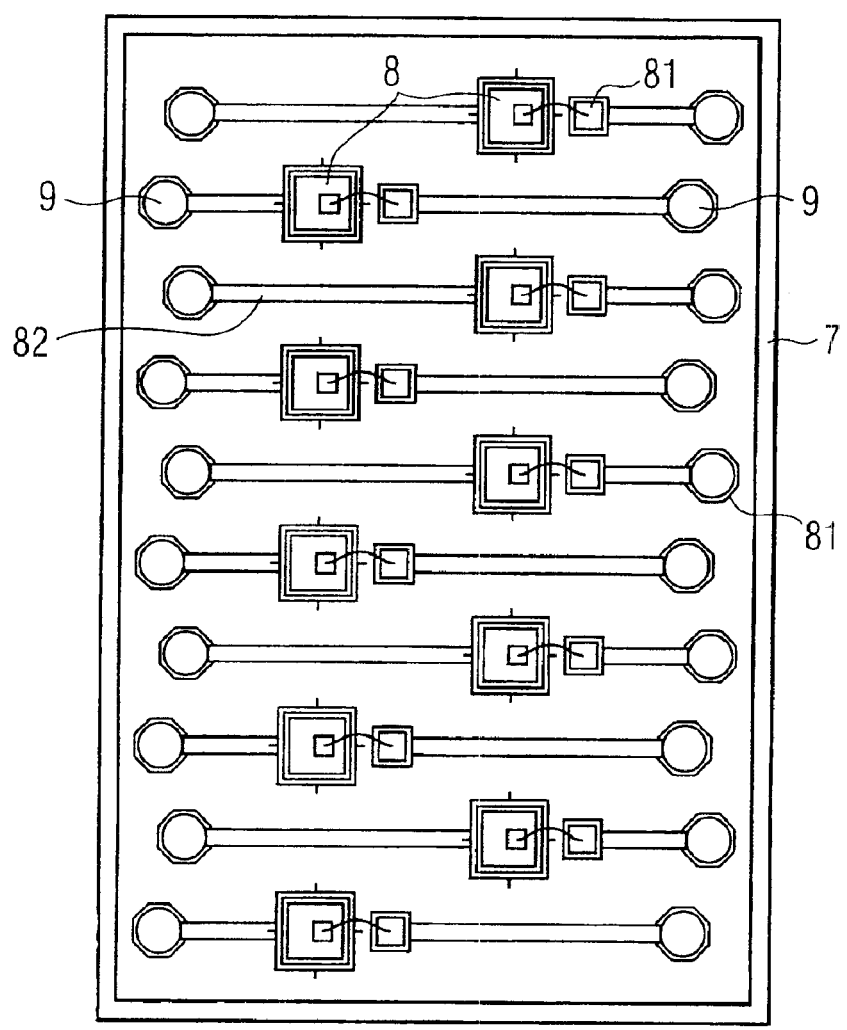
FIG. 2 is a plan view showing the underside of a support submount for the configuration.

FIG. 2 shows a plan view of the underside of the support submount 7 from FIG. 1. The submount preferably includes a $SiO_2$ substrate having a thickness of, by way of example, 400 μm. A plurality of photodiodes 8 are offset on the submount 7 in two rows. In this case, the photodiodes 8 respectively have their p-contact on the surface and their n-contact on their back. The submount 7 holds thin-film gold metalizations that form solder pads 81 and conductor tracks 82 for making contact with the photodiodes 8 and for solder bumps 9.

The electrical contact for the submount 7 or for the photodiodes 8 is made via the solder bumps 9, which provide an electrical connection to appropriate contact pads and metalized areas of the planar circuit. In this case, the n-contacts are preferably connected to a common metalization on the planar circuit, so that a common n-contact is obtained. To connect the submount 7 and the planar circuit 5, the solder bumps 9 and the metalized areas of the planar circuit are brought into line and the two components are soldered in a simple furnace step at approximately 270° C. In this context, the bump height can be used to set the distance between the submount 7 and the planar circuit 5 over a wide range.

Figure 3A:
FIGS. 3a–3h are sectional views showing the individual method steps for manufacturing an configuration shown in FIG. 1.
Figure 3B:
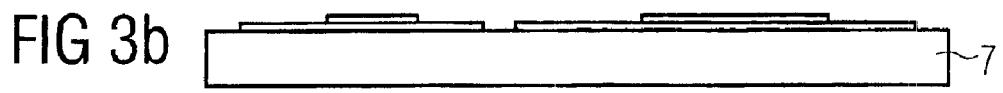
Figure 3C:

The manufacture and exact construction of the units of the detection configuration are explained below with reference to FIGS. 3a–3h. In this context, FIGS. 3a to 3d are first used to describe the manufacture of the submount 7. First, a gold metalization is put onto the submount and a photolithographically produced mask (e.g. AZ resist) and an etching method is used to structure said gold metalization, so that solder pads and conductor tracks are provided for the photodiodes and solder bumps (FIGS. 3a and 3b). Next, a passivation and soldering stop layer, e.g. Cyclotene, is spun on, structured and fixed. A template is then used in a screen-printing method to spray on lead/tin spherical indentations (FIG. 3c). These are briefly heated so that they become round. Alternatively, "stud bumps" made of gold or gold/tin are put on as solder bumps.

Figure 3D:
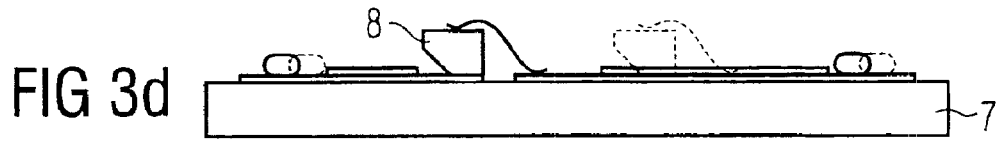

Next, photodiodes 8 are mounted onto each submount in two rows offset from one another using laser soldering or by bonding using a conductive diode adhesive bonder. The mounting side of the photodiodes is simultaneously their cathode contact. The anode contact of the photodiodes is on the photodiode surface. The anode contact is produced using a bonding wire (FIG. 3d).

The steps mentioned may be performed in the wafer composite. The systems are then separated by sawing them out of the wafer composite. The separated systems are checked to ensure that they function.

Figure 3E:
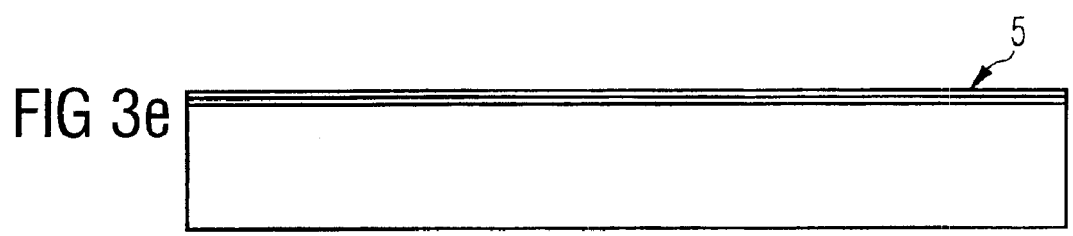
Figure 3F:
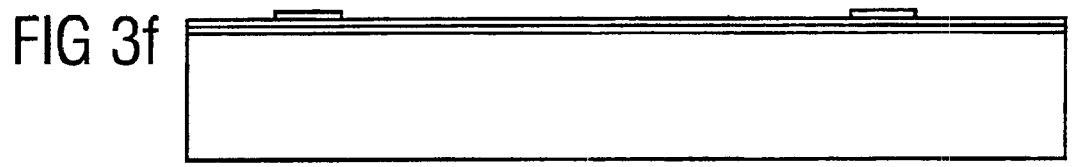
Figure 3G:
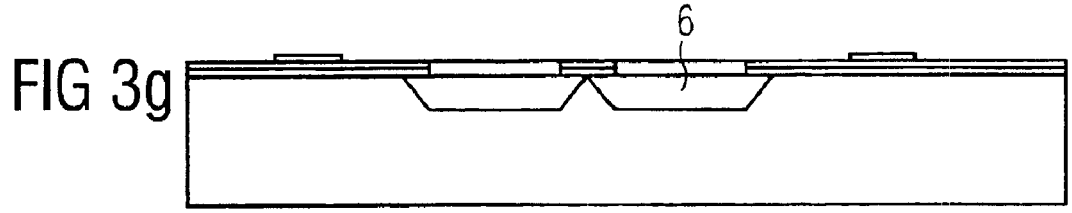
Figure 3H:
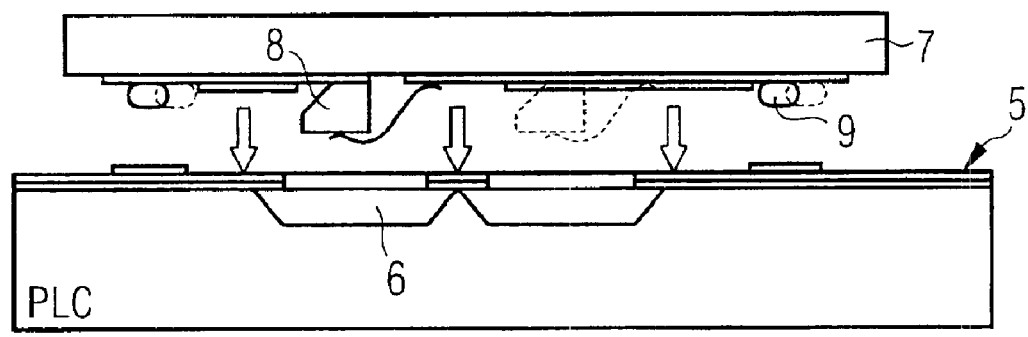
Figure 5:
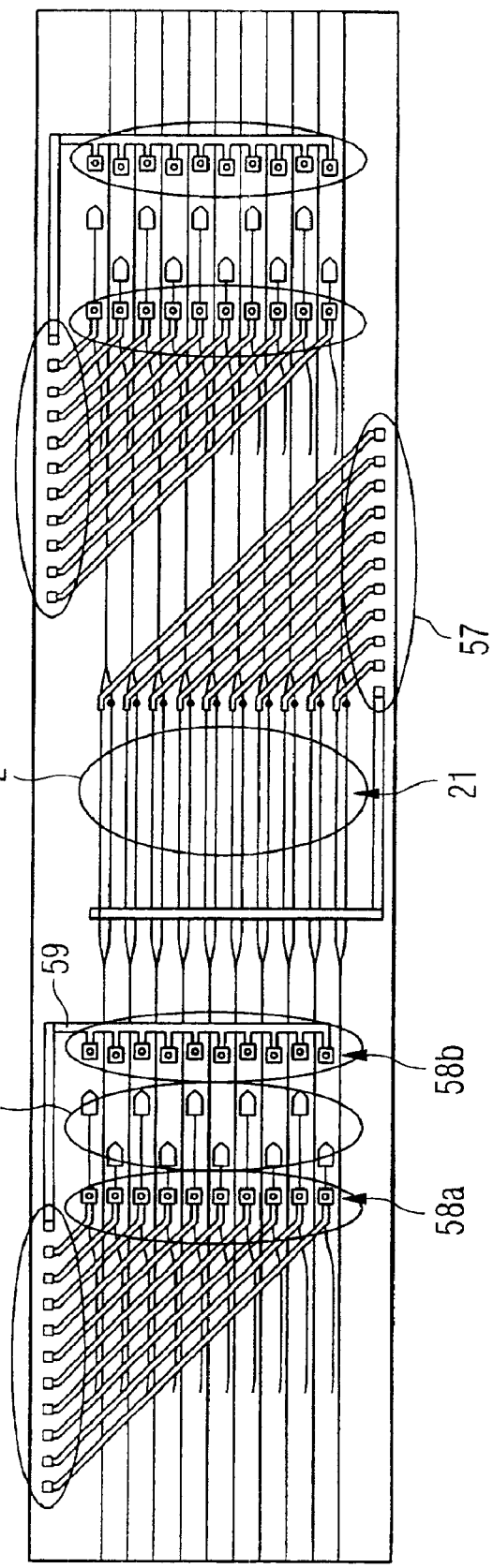
FIG. 5 is a plan view showing a multichannel attenuator apparatus as shown in FIG. 4, where the photodiodes are respectively disposed in two rows and, additionally, solder bump mounting areas are shown.

The planar light circuit 5 is manufactured by first applying $SiO_2$ layers onto a silicon wafer as shown in FIG. 5 and structuring the core layer (FIG. 3e). Next, a metalization is vapor-deposited and structured (FIG. 3f), a passivation and soldering stop layer is applied, and then deep etching is carried out to produce the trenches 6 (FIG. 3h). These steps can also be performed in the wafer composite, with separation and function checking being carried out subsequently.

Finally, the detection unit, including support submount 7 and photodiodes 8, is mounted on the planar light circuit 5 using flip-chip mounting, the photodiodes 8 projecting upside down into the trenches 6 in the planar light circuit. Solder bumps are used to produce an electrical connection between the submount 7 and the planar light circuit.

Figure 4:
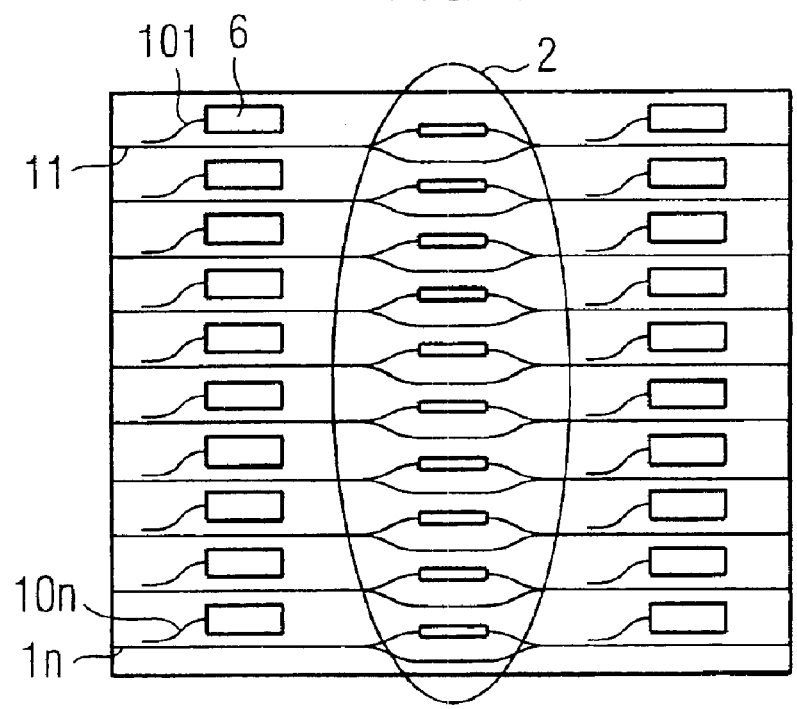
FIG. 4 is a plan view showing a multichannel attenuator unit with inventive detection configurations for monitoring monitor waveguides by measurement.

FIGS. 4 and 5 show the use of the inventive detection configuration in a 10-channel attenuator apparatus. The actual attenuator unit 2 includes, by way of example, thermo-optically controllable Mach-Zehnder interferometers, as was described in the introduction with reference to FIG. 7. Each optical channel 11–1n to be monitored has an associated monitor channel 101–10n into which approximately 3% of the light power in the optical channel 11–1n is injected using a coupler. The channel distance between the individual optical channels 11–1n is preferably 250 μm or 500 μm.

The monitor channel is terminated by a detection configuration as shown in FIG. 1, and the light in the respective monitor channel is detected by a photodiode. As FIG. 4 shows, for this purpose, the surface of the PLC contains a multiplicity of etched trenches approximately 100 μm deep, which respectively interrupt a monitor channel 101–10n and serve to hold a detection unit. The monitor channels are used to measure what optical power the optical signals have upstream and downstream of the attenuator apparatus 2 in the individual channels.

This information can be used in a manner known per se to construct a control loop for the attenuator apparatus 2. In the illustration shown in FIG. 5, as an addition to the illustration shown in FIG. 4, bonding pads or solder bump mounting areas 58a for the p-contacts of the photodiodes and also bonding pads or solder pads 57 for heating elements of the Mach-Zehnder interferometers in the attenuator unit 2 are shown. Electrical contact is made with the n-contacts of the photodiodes via solder bump mounting areas 58b, which are connected to one another by means of a continuous metalization 59 on the planar circuit. The configuration of the trenches and of the photodiodes is illustrated as with reference to FIGS. 1 and 2.

The implementation of the invention does not relate to the exemplary embodiments illustrated above. The only matter of importance to the invention is that a planar light circuit contains at least one trench, which respectively interrupts or terminates at least one optical channel, and the trenches respectively contain at least one detection unit that detects the optical signals in an optical channel.

We claim:

1. A configuration for detecting optical signals, comprising:
   a planar light circuit including an optical channel, said planar light circuit having a trench formed therein and interrupting said optical channel;
   a support submount attached to said planar light circuit outside said trench; and
   a detection unit disposed in said support submount to detect optical signals in said optical channel.

2. The configuration according to claim 1, wherein said trench in the planar light circuit terminates said optical channel.

3. The configuration according to claim 1, including a row of said detection units disposed on said support submount, said detection units being photodiodes.

4. The configuration according to claim 3, including a second row of photodiodes on said support submount offset from said first row.

5. The configuration according to claim 3, wherein:
said planar light circuit has a plane; and
said photodiodes each have a bevel angled to said plane of said planar light circuit.

6. The configuration according to claim 1, including metalized areas on said planar light circuit; said support submount being mounted on said optical circuit and contacting said optical circuit via said metalized areas.

7. The configuration according to claim 6, including solder bumps on said support submount for connecting to contact areas of the optical circuit.

8. The configuration according to claim 6, including gold metalizations on said support submount, said gold metalizations simultaneously serving as a conductor track and as mounting areas for said detection unit, said solder bumps, and bonding wires.

9. The configuration according to claim 3, including a common metalization connecting said photodiodes to said support submount.

10. The configuration according to claim 1, wherein said support submount is optically transparent.

11. The configuration according to claim 3, wherein said photodiodes are laser-soldered on said support submount from below through said support submount.

12. The configuration according to claim 1, wherein said trench formed in said planar light circuit complements said detection unit, said detection unit being inserted tightly into said trench.

13. An attenuator apparatus, comprising:
an attenuator unit;
a multiplicity of optical principal channels carrying optical signals having an optical power, respectively passing through said attenuator unit, and having a respective associated monitor channel receiving a particular percentage of the optical power in said associated principal channel; and
a configuration detecting the optical signals in said monitor channels, including:
a planar light circuit including an optical channel;
said planar light circuit having a trench formed therein and interrupting said optical channel; and
a detection unit being disposed in said trench and detecting the optical signals in said optical channel.

14. The attenuator apparatus according to claim 13, wherein said monitor channels run parallel to said respective optical principal channels without crossing one another or said principal channels.

15. The attenuator apparatus according to claim 13, wherein said principal channels respectively run along said trenches for said detection units and are undisturbed in said planar light circuit.

16. A method for manufacturing a configuration for detecting optical signals in an optical channel in a planar light circuit, which comprises the following steps:
providing a support submount;
mounting a detection unit on the support submount;
providing a planar light circuit with an optical channel;
interrupting the optical channel by forming a trench in the planar light circuit;
placing the support submount on the planar light circuit outside said trench using flip-chip mounting; and
inserting a detection unit into the trench.

17. The method according to claim 16, which further comprises, before the mounting step:
applying and structuring a metalization to the submount carrier;
applying and structuring a soldering stop layer to the submount carrier; and
applying solder bumps to the submount carrier.

18. The configuration of claim 1, wherein said support submount is attached to said planar light circuit by flip-chip mounting.

19. The configuration of claim 1, wherein said detection unit is not directly attached to said planar light circuit.

* * * * *